(No Model.) 2 Sheets—Sheet 1.
P. NELSON.
HARROW.
No. 327,713. Patented Oct. 6, 1885.
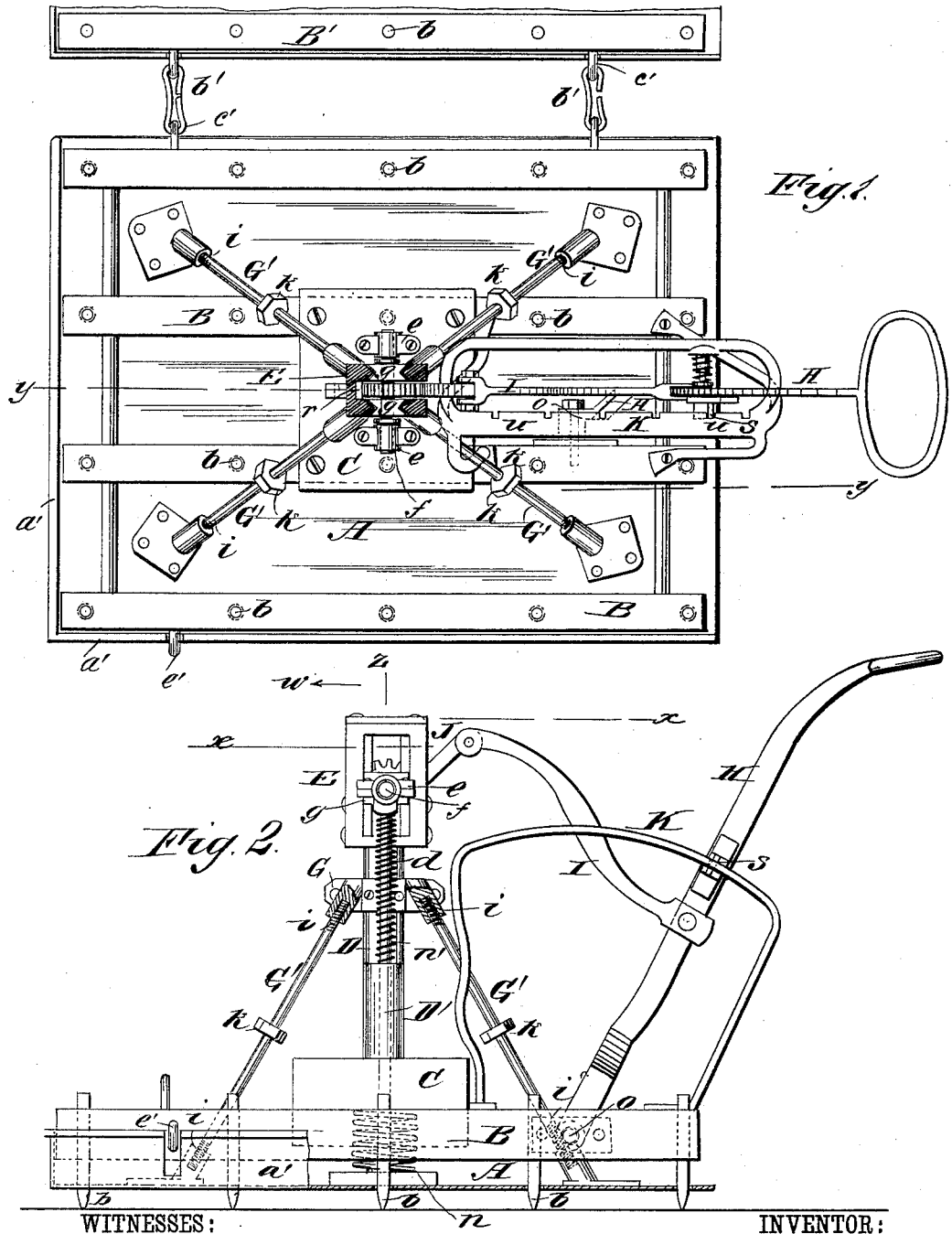
WITNESSES:
F. McArdle.
C. Sedgwick
INVENTOR:
P. Nelson
BY Munn & Co.
ATTORNEYS.

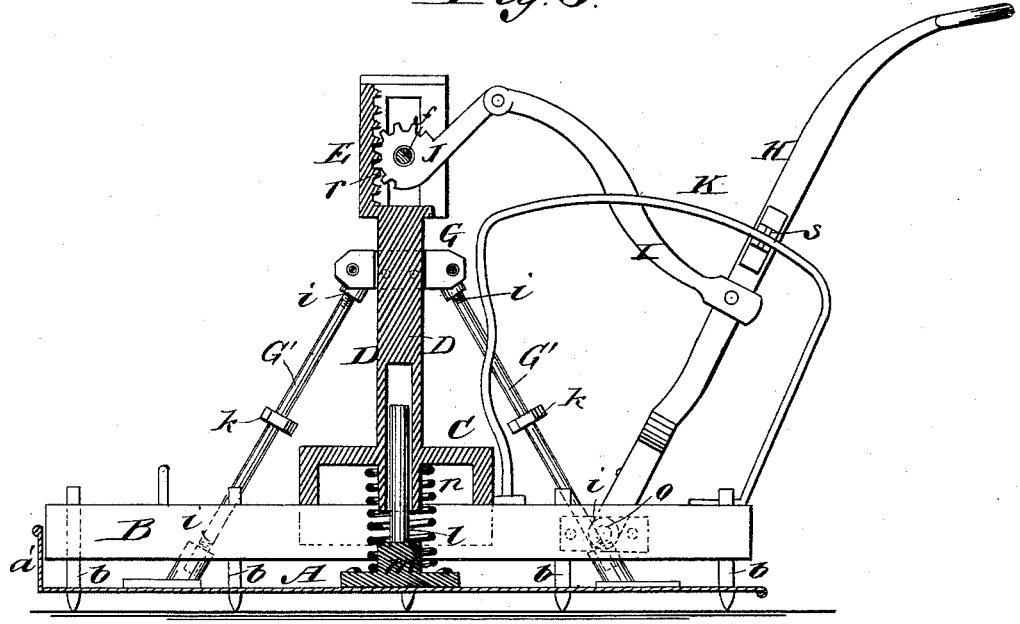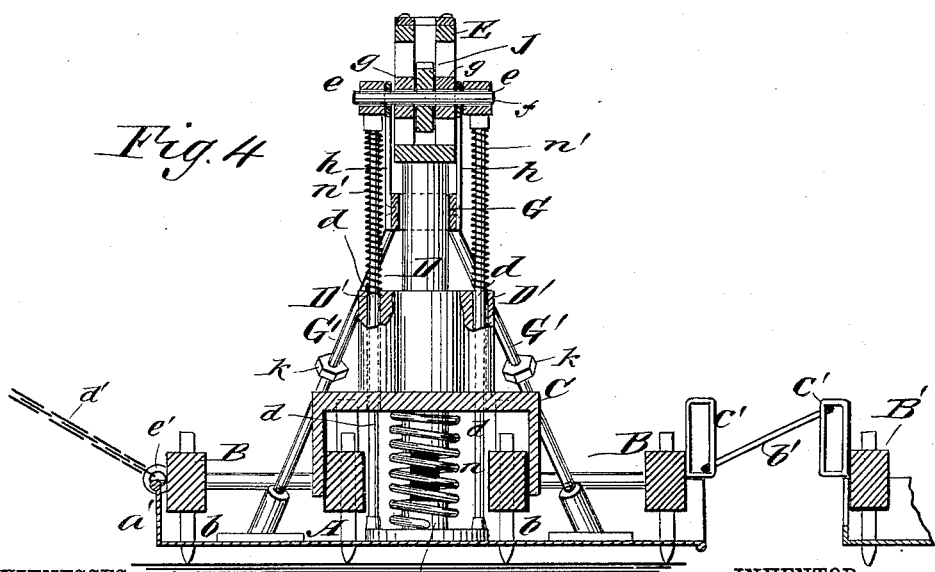

UNITED STATES PATENT OFFICE.

PHILIP NELSON, OF LAS VEGAS, TERRITORY OF NEW MEXICO.

HARROW.

SPECIFICATION forming part of Letters Patent No. 327,713, dated October 6, 1885.

Application filed August 12, 1885. Serial No. 174,199. (No model.)

*To all whom it may concern:*

Be it known that I, PHILIP NELSON, of Las Vegas, in the county of San Miguel, Territory of New Mexico, have invented certain new and useful Improvements in Harrows, of which the following is a full, clear, and exact description.

This invention is designed as an improvement on the harrow for which Letters Patent No. 310,499, were issued, January 6, 1885, to myself, conjointly with Christopher Drew and Andrew W. Leisner, all of Las Vegas, New Mexico.

In order to make the invention which is the subject of the present specification more readily understood, I will here first briefly describe the invention covered by the Letters Patent above referred to. It consisted, mainly, of a plate of metal or other suitable material as large as the area of the harrow, fitted so as to be capable of adjustment up and down, on or over the teeth of the harrow, attached to a frame above the plate, and projecting down through the plate. By moving said plate down to the points of the teeth it served as a cleaner to force down trash collecting on the teeth and cause the same to escape from the points of the teeth. Said plate also served as a gage, by moving it up or down, to regulate the depth of the teeth in the ground. Likewise, when set down to the points of the teeth, as a smoothing-plate to the surface of the ground, with which it would then be in contact, and be dragged over and carry the weight of the harrow for pressing the surface of the ground smooth.

My invention consists in certain novel constructions and combinations of parts connected with the support and adjustment or operation of the plate hereinbefore referred to, through which the harrow-teeth pass, whereby a steadier action is produced for the plate, its level or required position is readily secured, and greater strength, generally, with more force and freedom of action for the plate is obtained, substantially as hereinafter shown and described.

Reference is to be had to the accompanying drawings, forming part of this specification, in which similar letters of reference indicate corresponding parts in all the figures.

Figure 1 represents a sectional plan on the irregular line $x\ x$ in Fig. 2 of a harrow embodying my invention with portion of another harrow attached. Fig. 2 is a partly broken side view; Fig. 3, a vertical section on the irregular line $y\ y$ in Fig. 1; and Fig. 4, a vertical section on the line $z\ z$ in Fig. 2, looking in direction of the arrows $w\ w$.

A indicates the thin metal or other plate which forms the cleaner, gage, or ground-smoothing device of the harrow, the same being of the same area as the harrow, or thereabout, and being fitted over the teeth $b$ of the harrow with freedom to move up and down said teeth that pass through perforations in the plate for the purpose, and are secured to the base-frame B above the plate A. Said plate A is provided with flanges $a'$ on its forward edges to prevent the earth and other matter from collecting between it and the under side of the frame B.

Mounted on and secured to the base-frame B at its center is a box or hollow frame, C, provided with an upper central stem or post, D, that may also project below the top of the box part C, and which carries on its upper end a vertically-slotted guide-piece, E. Upon each side of this stem or post D is a tubular guide, D', which may be of one and the same piece with the stem or post D, and which serve to guide or steady and support duplicate rods $d\ d$, that connect at their lower ends with the plate A, and answer the purpose of transmitting motion to said plate. The upper ends of these rods $d\ d$ carry boxes $e\ e$ on either side of the slotted guide-piece E, and said boxes support a cross pin or shaft, $f$, on which are slides $g\ g$, that are free to work up and down within and on opposite sides of the slotted guide-piece E. From this cross pin or shaft $f$ are downwardly-projecting arms $h\ h$, that connect below with the head G of a spider-frame, composed in part of stay-rods $G'\ G'$. These stay-rods, as in the former patent hereinbefore referred to, are set inclining toward the four corners of the plate A; but they are differently connected. Thus they connect at their upper and lower ends by reverse screw-threads $i\ i$ with the head G of the spider-frame, and by screw-sockets with the plate A, so that by turning said stay-rods, through nuts k fast on them, the plate A may be adjusted at its four corners to move easy and occupy the position required, and to be let down or be taken up, as necessary. The stem or post D is also made tubular at its lower end, and has a steady-pin, l, which projects from a central hub, m, on the plate A, arranged to enter up within said tubular portion of the stem. This, in connection with the tubular guides D' D' and rods d d, forms a triple guiding-support for the plate A in its up-and-down movement, and gives great strength and steadiness.

The plate A is raised and held upward in part by a suitably-attached coiled spring, n, arranged around the hub m and lower end of the stem D, and in part by other coiled springs, n' n', arranged around the rods d d, between the tops of the guides D' D' and the boxes e e.

The lever H, by which the plate A is forced down or operated, is fulcrumed, as at o, to the base-frame B, and has attached to it a rod, I, which in turn is connected with a toothed lever, J, arranged on the cross pin or shaft f, and made to engage with a rack, r, in the slotted guide-piece E. By moving back the lever H the shaft f with its connections, including the arms h h, the rods d d, and spider-frame G G', will be lowered. This gives a very powerful and efficient pressing action, and as the plate A is adjusted up or down it is held or locked in position by a spring-catch, s, connected with the lever H, and arranged to engage with any one of a series of notches, u, in a skeleton guard, K, within or along which the lever H works.

If desired, two harrows capable of independent operation may be worked together, and so that when one harrow is lifted the other may be lowered, the two harrow-frames B B' being connected together by links b' made to engage with upright slotted arms or eyebolts c' on the adjacent beams of the harrow-frames, the one end of the links b' remaining in the bottoms of the slotted attachments c' on the one harrow-frame and sliding at their opposite ends up to the top of the slotted attachments c' of the adjacent harrow-frame.

The draft-chain d' is attached to the eye e' of the harrow-frame B.

Having thus fully described my invention, I claim as new and desire to secure by Letters Patent—

1. The combination, with the base-frame of the harrow having attached teeth b, and the plate A, adjustable up and down over said teeth, of the triple guide for said plate consisting of the central stem or post, D, the pin l of the plate A in sliding tubular connection with said post, the tubular guides D' D', and the rods d d, substantially as specified.

2. In combination with the harrow-frame having attached teeth b, and the plate A, the stem or post D, and the spider-frame G G', having its stay-rods G', connected by reverse screw-threads i at their opposite ends with the head G of the spider-frame and with the plate A, essentially as and for the purposes herein set forth.

3. The combination, with the plate A, the harrow-frame having attached teeth b, and the stem or post D, of the spider-frame G G', the tubular guides D', the rods d, the slotted frame-piece E, having a rack, r, the boxes and slides e g, the shaft f, the arms h, connecting said shaft with the spider-frame, the toothed lever J, the rod I, and the lever H, substantially as shown and described.

PHILIP NELSON.

Witnesses:
XAVIER MARTIN,
CHRISTOPHER DREW.